US005529314A

United States Patent [19]

Ekstam

[11] Patent Number: 5,529,314

[45] Date of Patent: Jun. 25, 1996

[54] PUMP SHAFT LUBRICATED BEARING FLUID SEAL ASSEMBLY

[76] Inventor: Charles L. Ekstam, 2308 Barberry Dr., Bement, Ill. 61813

[21] Appl. No.: 119,382

[22] Filed: Sep. 13, 1993

[51] Int. Cl.[6] .............................. E21B 33/00; F16J 9/00; F16J 15/00

[52] U.S. Cl. .............................. 277/59; 277/58; 277/71; 277/79; 277/167.3; 277/68

[58] Field of Search .............................. 277/59, 58, 2, 277/71, 133, 79, 69, 123, 68, 167.3; 415/109, 118, 175, 230, 901; 384/477, 471, 472, 468

[56] References Cited

U.S. PATENT DOCUMENTS

| | | | |
|---|---|---|---|
| 1,063,633 | 6/1913 | Wilkinson | 277/58 |
| 1,269,787 | 6/1918 | Church . | |
| 2,222,274 | 11/1940 | Antonsen | 123/139 |
| 2,642,148 | 6/1953 | Grisé | 183/2.5 |
| 3,740,057 | 6/1973 | Doyle et al. | 277/3 |
| 3,806,287 | 4/1974 | Sadler et al. | 418/225 |
| 3,905,450 | 9/1975 | Persson | 277/59 |
| 4,010,960 | 3/1977 | Martin | 277/59 |
| 4,231,718 | 11/1980 | Ruhl et al. | 417/366 |
| 4,372,847 | 2/1983 | Lewis | 210/86 |
| 4,411,239 | 10/1983 | Kelch | 123/557 |
| 4,454,848 | 6/1984 | Duprez | 123/516 |
| 4,539,965 | 9/1985 | Soltau | 123/514 |
| 4,763,684 | 8/1988 | Kelch | 137/196 |
| 4,933,093 | 6/1990 | Keller | 210/774 |
| 4,979,482 | 12/1990 | Bartlett | 123/510 |
| 5,207,794 | 5/1993 | Erdal | 277/59 |

FOREIGN PATENT DOCUMENTS

| | | | |
|---|---|---|---|
| 1573281 | 6/1990 | U.S.S.R. | 277/2 |
| 1216653 | 12/1970 | United Kingdom | F02M 37/20 |

*Primary Examiner*—William A. Cuchlinski, Jr.
*Assistant Examiner*—Keith Hwang
*Attorney, Agent, or Firm*—Duft, Graziano & Forest

[57] ABSTRACT

A fluid pumping system includes a housing that defines a fluid chamber having a wall with an aperture therethrough to communicate the fluid chamber with an outside area. A shaft extends through the aperture, and is mounted for axial rotation. The shaft carries a plurality of seals within the aperture that serve to isolate the fluid chamber from the outside area. The seals are spaced apart to define respective cavities that may be liquid filled to prevent seal failure.

12 Claims, 2 Drawing Sheets

PUMP SHAFT LUBRICATED BEARING FLUID SEAL ASSEMBLY

BACKGROUND OF THE INVENTION

1. Field of the Invention

The present invention is broadly concerned with an improved fluid pumping system having a fluid seal assembly that can be used to seal an opening along a rotatable shaft in fuel pumps and the like. More particularly, the invention is concerned with a fuel pump seal assembly having multiple sealing elements including a fluid chamber that acts as a fluid seal to result in improved fuel economy and horsepower performance by isolating the fuel chamber from outside sources of air.

2. Description of the Prior Art

Internal combustion engines are typically supplied by a fuel pumping system that may include a number of sequentially interconnected pumps each having rotatable shafts which require seal assemblies to prevent leakage. For example, a pump may move fuel from a fuel tank through a filter assembly to the intake of a transfer pump. The transfer pump may supply a pressure regulated stream of fuel to a distribution pump or in-line multicylinder pump which feeds a high pressure diesel injector rail system. In the event that air enters the sealed fuel supply system, severe engine problems can develop, such as a corresponding drop in fuel economy and horsepower, difficult starting, smoking exhaust, a spongy throttle, diesel knock or engine misfire, stalling, and low idle RPM surges. Therefore, fuel pumps typically have a seal assembly that is intended to isolate separate bodies of fluid, such as a liquid fuel and atmospheric gases, which would otherwise bleed together across various openings that accommodate a rotatable shaft.

Previous pump seal assemblies have typically used one or two neoprene seals that are press-fit into an aperture in a housing wall. Different types of fluid are thereby isolated across opposed faces of the wall. In the case where two neoprene seals are utilized, these may be spaced apart along the length of the shaft to define a cavity therebetween, and the housing wall may have a vent opening that communicates between the outside atmosphere and the cavity. This vent opening is also known as a weep hole, because it is possible to see liquid pouring out of the hole after one of the seals has failed. In the dual-deal system, one of the seals may prevent fuel from communicating with the vent hole, and the other seal may prevent lubricating oil from and accessory drive mechanism from communicating with the vent hole. It is typically assumed that the seal assembly is completely intact unless liquid is visibly present at the exterior weep hole, since the pumps typically operate with fuel circulated in contact with the seal for cooling purposes at positive internal pressures ranging between about 3 to 5 psig.

In tractor-trailer diesel engine applications, these dual seals are not normally expected to fail prior to having travelled between about 40,000 to 100,000 or more miles. A failure of the seal assembly in a diesel fuel pump is normally assumed to be noticeable as a leak from the weep hole requiring replacement of the seal or the entire pump.

SUMMARY OF THE INVENTION

The present invention overcomes the problems that are outlined above, and provides a greatly improved fuel pump assembly having a plurality of seals that prevent the atmosphere from entering a sealed fluid chamber. The invention also provides lubrication to both sides of a primary seal, which serves to significantly reduce wear on the seal. It has been discovered that the prior art seal assemblies actually fail much sooner than previously expected without visible leakage at the weep hole. Where an existing diesel engine is equipped with a retrofit injector pump system according to the invention, the multiple seal system provides a significant improvement in engine performance as compared to mileage before and after the retrofit operation.

Broadly speaking, the invention provides a hydraulic system that includes a liquid seal assembly which serves to isolate separate bodies of fluid. This hydraulic system includes a housing having an apertured wall and an axially rotatable shaft extending through the aperture. The shaft carries at least two seals, which are positioned around the shaft and within the aperture. A cavity between the seals is connected to a fluid reservoir, and the fluid therein enhances the sealing capacity of the seals.

More preferably, the hydraulic system includes a shaft that carries at least three seals including one inner seal and two outer seals. These seals define respective cavities between the inner and outer seals. The cavities can be of equal volume, as the two outer seals may be spaced equal distances apart along the length of the shaft from the inner seal. The housing may be provided with a first fluid passageway communicating between one of the cavities and a first fluid source. The housing may also be provided with a second fluid passageway communicating between a different cavity and a second fluid source. The first and second fluid sources may include respective liquid and atmospheric sources, with the liquid filled cavity providing a liquid seal having enhanced sealing and lubricating functions that serve to prolong the life of the seal assembly.

DETAILED DESCRIPTION OF THE PREFERRED EMBODIMENT

Figure 1:
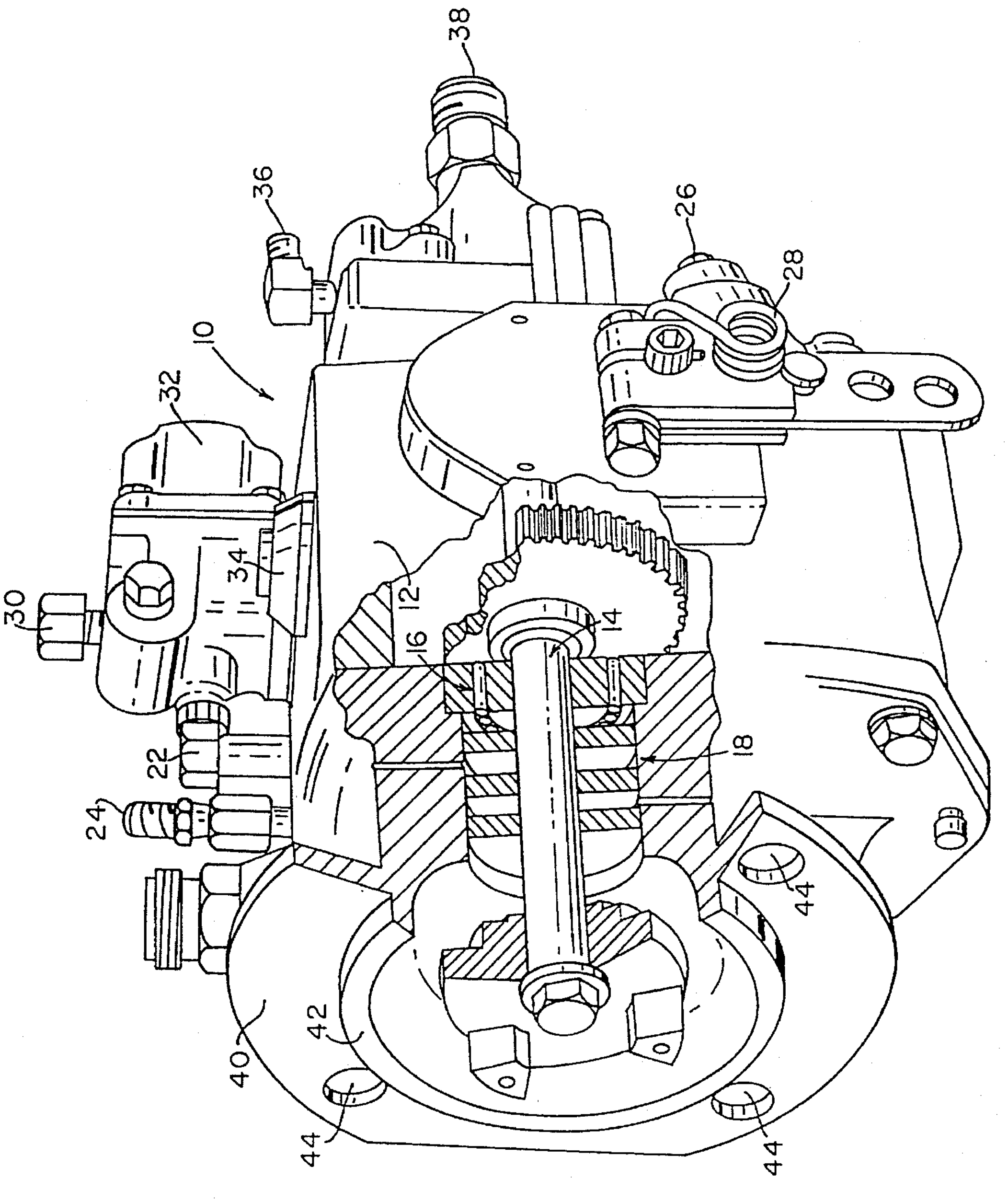
FIG. 1 is a perspective cutaway side view of a fuel pump illustrating the fuel pumping system of the invention, and depicting the seal assembly thereof.

Turning now to the drawings, and particularly FIG. 1, fluid pumping system 10 includes housing 12, shaft assembly 14, shaft mounting assembly 16, and seal assembly 18.

Housing 12 is a diesel injector pump housing that may provide for any number of conventional features which are commercially available on a widespread basis and understood by those skilled in the art. For example, several of these features are useful in controlling engine speed by adjusting fuel availability, including aneroid fuel control ("AFC") fuel return port 22, AFC air supply port 24, idle speed screw 26, and fuel pressure screw 28. Various other features provide couplings that communicate fuel to various locations within the fuel system, including rail couplings 30 (providing fuel to the diesel injectors), electromagnetic fuel shutoff valve 32, priming plug 34, gear pump diesel coolant fitting 36, and fuel inlet connection 38. Flange 40 is provided with lip 42 and apertures 44 for coupling with a corresponding accessory drive mechanism (not depicted).

Figure 2:
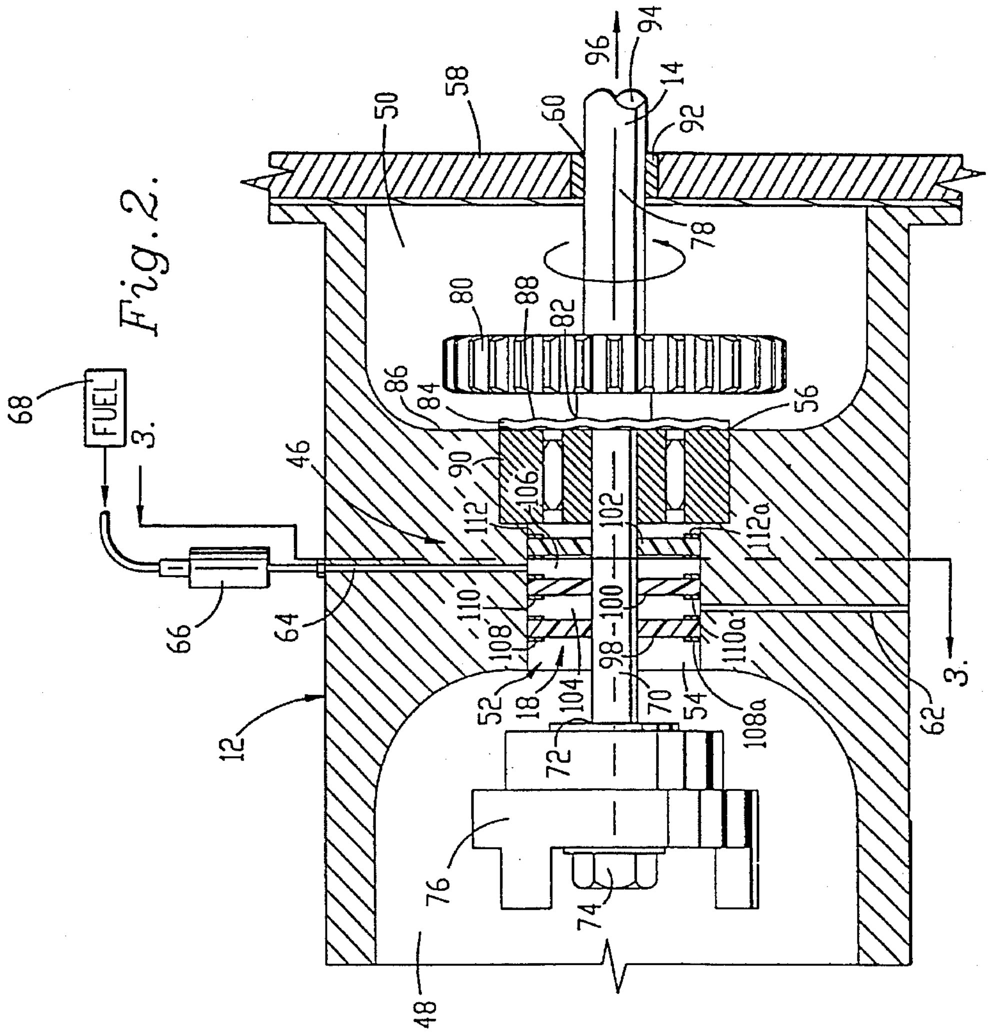
FIG. 2 is a side view of the seal assembly of the invention, illustrating the seal assembly in relationship with the mounting means for the axially rotatable shaft.
Figure 3:
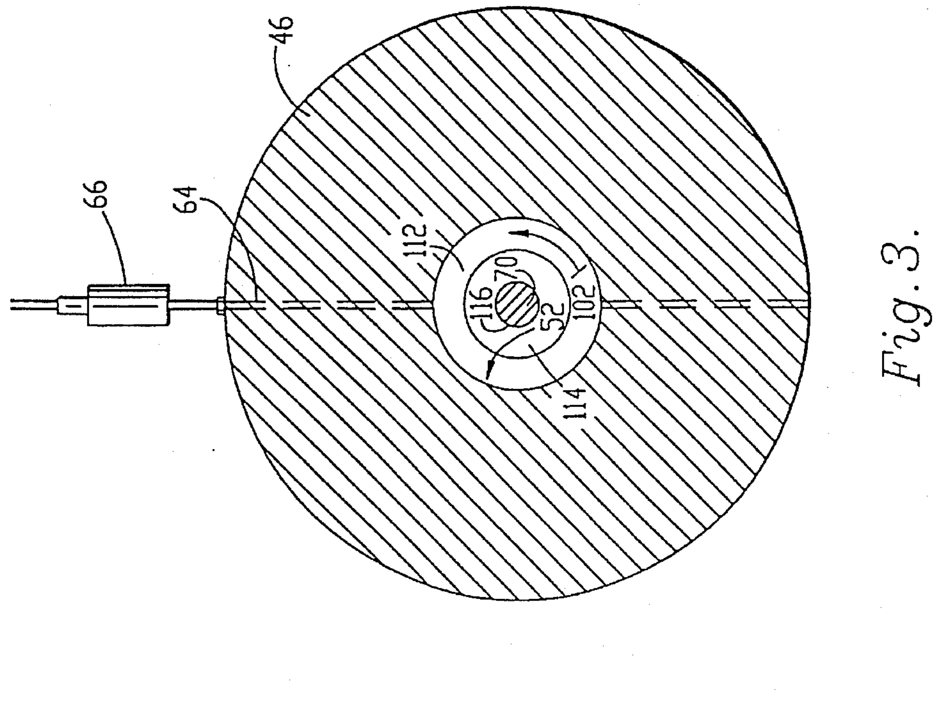
FIG. 3 is a vertical front sectional view taken along line 3—3 of FIG. 2 and illustrating the seal assembly within the apertured wall of the housing.

As can be seen in FIGS. 2 and 3, housing 12 has wall 46, which separates transfer case chamber 48 from diesel fuel chamber 50. Aperture 52 extends through wall 46 from chamber 48 to chamber 50, and includes a narrowed portion 54 followed by an enlarged diameter portion 56, with both portions 54 and 56 presenting respective interconnected cylindrical spaces. Housing 12 also includes support structure 58 having opening 60 therethrough for accommodating shaft assembly 14. Vent opening 62 forms a fluid passageway extending between aperture 52 and the outside atmosphere. Pathway 64 forms a fluid passageway extending between aperture 52 and diesel coupling 66 which, in turn, communicates with a gravity fed fuel supply 68.

Shaft assembly 14 includes an elongated and rounded shaft 70 having an end 72 that threadably accommodates bolt 74 which secures in-line coupling 76. Coupling 76 is useful for connecting with the accessory drive mechanism (not depicted) for rotation of shaft 70 therewith. Opposite end 72, shaft 70 has a portion 78 of increased diameter, which carries gear 80. Gear 80 is keyed to shaft 78 and used to drive other components (not depicted) of the working pump. Shoulder 82 of shaft portion 78 engages retaining ring 84 to hold the same approximately flush against face 86 of wall 46. Ring 84 has a concavo-convex surface 88 that rotates with shaft 70.

Shaft assembly 14 is mounted for axial rotation in housing 12 through the use of ball bearing 90 and journal bearing 92. Bearing 90 is a conventional roller or ball bearing, which is held within aperture 56 by retaining ring 84. Journal bearing 92 is sized to accommodate shaft 78 all within opening 60. End 94 of shaft 70 is connected with a high pressure gear pumping assembly (not depicted) that serves to prevent movement of shaft 70 in the direction of arrow 96.

Seal assembly 18 includes at least three separate seals, e.g., first outer seal 98, inner seal 100, and second outer seal 102. The outer seals 98 and 102 are spaced equal distances apart from inner seal 100 to define first cavity 104 and second cavity 106. Accordingly, cavities 104 and 106 have equal volumes. Cavity 104 communicates with the outer atmosphere through vent hole 62. Cavity 106, which is closest to diesel chamber 50, communicates with fuel supply 68 through pathway 64 and coupling 66. Seals 98, 100, and 102 are conventional neoprene seals having inwardly concave metallic rings 108, 110, and 112, at their outer diameter. These are press-fit into aperture 52 to fit within corresponding inwardly concave retaining structures **108*a*, 110*a*, and 112*a* in aperture 52. Seal 102 forms the primary seal for isolating chambers 48 and 50. As can be seen from FIG. 2, the example of seal 102 presents mounting ring 112 within retaining structure 112*a* in aperture 52. Seal 102 has a central hole that presses to seal against shaft 70**.

In operation, pumping system 10 receives fuel at about 3 psig. As shaft 70 rotates, the concavo-convex surface 88 of ring 84 rotates therewith, thereby circulating cooling fuel to ball bearing 90. This circulation also induces cavitation proximal to bearing 90. A corresponding vacuum develops proximal to bearing 90 from the resulting turbulence and fluid viscosity resistance, despite the internal fuel pressure of about 5 psig. The localized vacuum pulls against seal assembly 18, which isolates diesel chamber 50 against the entry of contaminating fluids such as air and lubricating oils. Cavity 106 fills with diesel, which performs two functions as a liquid seal. First, the diesel serves to lubricate both seals 100 and 102. Thus, seal 102 is lubricated by diesel fuel on the side of chamber 50 as well as on the side of cavity 106. Second, the fuel is many times more viscous than air and, thus, is many times more resistive to flow across seal 102 that might otherwise be induced by the cavitation effect from the rotation of ring 88.

EXAMPLE 1

A pressure timing ("PT") style diesel fuel pump from Cummins of Columbus, Ind., was selected for modification to include a triple seal assembly of the type depicted in FIGS. 1–3. Three such pumps were manufactured, and substituted for the existing standard fuel pump assemblies on three tractor trailer trucks having 444 horsepower stepped timing control ("STC") engines. Conventional wisdom held that the existing standard fuel pumps did not leak air, because no fuel leakage was observed at the respective fuel pump weep holes.

In an effort to eliminate all air from the fuel supply to the engine, the fuel filter just prior to the injector pump was replaced with a filter assembly according to copending application Ser. No. 07/911,119, filed Jul. 9, 1992, "Fuel Delivery System For Diesel Engines," which is hereby incorporated by reference. The 07/911,119 application Ser. No. describes a filtration apparatus having an upper chamber for the removal of gas from bubbles that are captured within the incoming fuel stream.

STC timing is a variable timing apparatus including a tappet mechanism in each injector. The tappet mechanism may be pressurized and depressurized to cause the injectors to inject at different optimal positions of piston travel relative to top dead center. The pressure system typically advances the timing once the injector rail pressure falls below a threshold minimum value. Prior to the modification of the existing fuel pumps, these engines were known to spew large clouds of carbon soot upon engine ignition, but this problem ceased after the pumps were modified. Operators of the trucks using modified pumps reported improved power output, less need to shift gears, and fewer instances of smoking exhaust, as compared to performance prior to pump replacement. It is believed that the elimination of soot and exhaust smoking problems may be attributed to the elimination of air from the engine fuel supply and the corresponding elimination of compressible air effects upon the injector tappet mechanism.

Table 1 recites the observed improvements (about 20% to 25%) in fuel economy under similar continued operating conditions for each vehicle having a new filter assembly and a modified fuel pump according to the invention.

TABLE 1

| | Improvements in Fuel Economy 444 Horsepower Engines | | |
|---|---|---|---|
| Engine | Mileage Before Retrofit With New Pump (Miles per Gallon) | Mileage After Retrofit (Miles per Gallon) | Fuel Economy Percentage Improvement |
| A | 5.0 | 6.3 | 26% |
| B | 4.7 | 5.7 | 21 |
| c | 5.4 | 6.3 | 17 |

EXAMPLE 2

Engine C (Cummins diesel, 444 horsepower) was provided as in Example 1 to include a new filter assembly and a modified fuel pump. The model of truck that was studied was designed to place 355 horsepower on the ground after drive train reductions from a 444 horsepower Cummins engine. Before the retrofit, the measured horsepower after drive train reductions was 366 horsepower @1900 rpm. After the installation of the filter and pump, the horsepower after drive train reductions was measured to be @412 horsepower; i.e., a 16% increase over the design rating and a 12.6% increase over the observed performance at 1900 rpm.

In retrofitting engine C, a positive fuel flow was measured from fuel reservoir 68 through passageway 64. This flow was observed after approximately thirty minutes of engine operation, but no fuel was observed to leak from vent opening 62. It was concluded that the fuel was traveling across seal 102 between cavity 112 and into chamber 50 responsive to cavitational forces therein. Due to the relative viscosities of diesel and air, in combination with probable turbulent flow, it was not possible to calculate the corresponding rates of air that would have communicated across seal 102 under identical circumstances; however, the relatively low viscosity of air would likely induce a rate of flow several times greater than that of the liquid.

Those skilled in the art will understand that the seal assembly as is described hereinabove may have many modifications that fall within the spirit of the invention. In particular, the seal assembly can be installed on any rotating shaft such as that for a water pump or axle; it is not necessary to install the seal in a diesel fuel pump. Additionally, many such seals may be placed side by side to enhance the sealing action.

We claim:

1. A pump shaft lubricated bearing fluid seal assembly for use in automotive applications comprising:

a wall presenting a first side and a second side, said wall having structure defining an aperture communicating said first side with said second side;

an elongated rotation pump work shaft having a first end portion extending beyond said aperture on said first side, a second end portion extending beyond said aperture on said second side, and a central portion received within said aperture and connecting said first end portion with said second end portion;

a bearing supporting said central portion at a bearing position proximal to said first side;

fluid motive means, coupled to said first end portion for rotation therewith, for circulating a first side fluid to said bearing; and a first pair of seals extending between said aperture and said central portion proximal to said bearing, said first pair of seals being offset a distance from one another to define a first cavity intermediate said first pair of seals, said shaft, and said aperture;

said wall including a sealing fluid supply passageway communicating said first cavity with a sealing fluid supply line.

2. The assembly as set forth in claim 1, said fluid motive means including a concavo-convex disk concentric with said shaft.

3. The assembly as set forth in claim 2, said concavo-convex disk being coupled to said first end at a position flush with said first side.

4. The assembly as set forth in claim 1, including a second pair of seals extending between said aperture and said central portion remote from said bearing across from said first pair of seals, said second pair of seals being offset a distance from one another to define a second cavity intermediate said second pair of seals, said shaft, and said aperture.

5. The assembly as set forth in claim 4, said first cavity being separated from said second cavity by at least one seal.

6. The assembly as set forth in claim 5, said wall including a drain passageway communicating said second cavity with an atmosphere outside said wall.

7. The assembly as set forth in claim 1 including sealing fluid within said sealing fluid supply line and first side fluid on said first side, said sealing fluid and said first side fluid having an identical composition.

8. The assembly as set forth in claim 7, said composition being that of diesel fuel.

9. The assembly as set forth in claim 8, said first side forming part of a diesel fuel chamber in a diesel injector pump.

10. The assembly as set forth in claim 9, said second side forming part of a transfer case chamber.

11. The assembly as set forth in claim 10, including a lubricating oil on said second side, said lubricating oil having a different composition from said diesel fuel.

12. The assembly as set forth in claim 4, said first pair of seals and said second pair of seals sharing a common central seal.

* * * * *